United States Patent [19]
Bard et al.

[11] Patent Number: 6,145,746
[45] Date of Patent: *Nov. 14, 2000

[54] PORTABLE OPTICAL SCANNING AND POINTING SYSTEMS

[75] Inventors: Simon Bard, Setauket; Joseph Katz, Stony Brook, both of N.Y.; Frederic Heiman, Los Gatos, Calif.; Paul Dvorkis, Stony Brook, N.Y.; Edward Barkan, Miller Place, N.Y.; Jerome Swartz, Old Field, N.Y.; Boris Metlitsky, Stony Brook, N.Y.; Miklos Stern, Flushing, N.Y.; Mark Krichever, Hauppauge, N.Y.

[73] Assignee: Symbol Technologies, Inc., Holtsville, N.Y.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/895,888

[22] Filed: Jul. 17, 1997

Related U.S. Application Data

[60] Division of application No. 08/381,515, Feb. 1, 1995, Pat. No. 5,793,032, which is a continuation-in-part of application No. 08/294,845, Aug. 29, 1994, abandoned, and a continuation-in-part of application No. 08/068,025, May 28, 1993, abandoned, and a continuation-in-part of application No. 07/884,734, May 15, 1992, abandoned, and a continuation-in-part of application No. 08/246,382, May 20, 1994, Pat. No. 5,410,140, which is a continuation of application No. 08/073,995, Jun. 9, 1993, abandoned, which is a continuation of application No. 07/787,458, Nov. 4, 1991, abandoned.

[51] Int. Cl.[7] ........................................... G06K 7/10
[52] U.S. Cl. ........................... 235/472.01; 235/462.45
[58] Field of Search .................................. 435/462, 472, 435/454, 462.45, 462.46, 472.01, 472.02

[56] References Cited

U.S. PATENT DOCUMENTS

| | | | |
|---|---|---|---|
| 3,801,775 | 4/1974 | Acker | 235/470 |
| 3,902,047 | 8/1975 | Tyler | 235/471 |
| 4,282,425 | 8/1981 | Chadima, Jr. et al. | 235/462 |
| 4,465,926 | 8/1984 | Apitz et al. | |
| 4,471,218 | 9/1984 | Culp . | |
| 4,908,500 | 3/1990 | Baumberger | 235/384 |
| 4,916,441 | 4/1990 | Gombrich . | |
| 4,958,064 | 9/1990 | Kirkpatrick | 235/384 |
| 5,047,615 | 9/1991 | Fukumoto et al. . | |
| 5,189,291 | 2/1993 | Siemiatkowski . | |
| 5,347,114 | 9/1994 | Tanaka | 235/467 |
| 5,541,398 | 7/1996 | Hanson . | |
| 5,640,193 | 6/1997 | Wellner . | |
| 5,675,138 | 10/1997 | La | 235/472 |

OTHER PUBLICATIONS

Datawand IIB/III Product Specifications, Symbol Technologies, Inc., (Mar. 1995).

*Primary Examiner*—Karl Frech
*Attorney, Agent, or Firm*—Kirschstein et al

[57] ABSTRACT

An optical scanning system for reading indicia of differing light reflectivity has an optical scan module which is adapted to be mounted on a finger of a user. A first peripheral module, preferably in the form of a wrist watch, has a receiver which detects the reflected light. A second peripheral module, mounted on the other arm of the user, communicates with the first module by radio frequency transmission. According to other aspects of the invention, the light detector may be mounted in a housing which is separate and part from the optical scan module. According to another aspect, a laser pointer or scanner is mounted to a ring which is arranged to be worn on a single finger of the user.

37 Claims, 12 Drawing Sheets

PORTABLE OPTICAL SCANNING AND POINTING SYSTEMS

This application is a division of application Ser. No. 08/381,515, filed Feb. 1, 1995, now U.S. Pat. No. 5,793,032; which is a CIP of Ser. No. 08/294,845, filed Aug. 29, 1994 now abandoned; and a CIP of Ser. No. 08/068,025, filed May 28, 1993 now abandoned; and a CIP of Ser. No. 07/884,734, filed May 15, 1992 now abandoned; and a CIP of Ser. No. 08/246,382, filed May 20, 1994, now U.S. Pat. No. 5,410,140; which is a continuation of Ser. No. 08/073,995, filed Jun. 9, 1993, abandoned; which is a continuation of Ser. No. 07/787,458, filed Nov. 4, 1991, abandoned. This application is also related to U.S. application Ser. No. 08/068,024 filed May 28, 1993 now U.S. Pat. No. 5,416,310, and Ser. No. 08/068,026 filed May 28, 1993, now abandoned.

BACKGROUND OF THE INVENTION

1. Field of the Invention

This invention relates to portable optical scanners for reading indicia of varying light reflectivity, and in particular to such scanners which are adapted to be worn on the person. The invention further relates to optical scanning systems in which the optical module for generating and emitting the light beam is physically separate and apart from the detector module. The invention also relates to a laser pointer, adapted to be worn on a finger of a user.

2. Description of the Related Art

Various optical readers and optical scanning systems have been developed heretofore for reading indicia such as bar code symbols appearing on the label or on the surface of an article. The symbol itself is a coded pattern of indicia comprised of, for example, a series of bars of various widths spaced apart from one another so bound spaces of various widths, the bars and spaces having different light reflecting characteristics. The readers in scanning systems electro-optically transform the graphic indicia into electrical signals, which are decoded into alphanumeric characters that are intended to be descriptive of the article or some characteristic thereof. Such characteristics are typically represented in digital form and utilized as an input to a data processing, system for applications in point-of-sale processing inventory control and the like. Scanning systems of this general type have been disclosed, for example, in U.S. Pat. Nos. 4,251,798; 4,369,361; 4,387,297; 4,409,470; 4,760,248; 4,896,026, all of which have been assigned to the same assignee as the instant application. As disclosed in the above patents, one embodiment of such scanning systems includes, inter alia, a hand held, portable laser scanning device supported by a user, which is configured to allow the user to aim the scanning head of the device, and more particularly, a light beam, at a targeted symbol to be read.

Such prior art hand held devices generally incorporate a light-receiving module which receives the light that has been reflected from the bar code symbol and determines, from the reflected pattern, the sequences of bars and spaces within the symbol. The unit may also incorporate decoding circuitry to decode the received information and to recover the underlying data (for example the alphanumeric data) which the bar code symbol represents.

It may in some circumstances be disadvantageous for the light generating and emitting module to be housed within the same unit as the light-receiving module and the decoding circuitry. In the first place, locating everything within the main housing requires that the bar code to be read is positioned so that most or at least a substantial proportion of the reflected light returns to the unit along the same path as the emitted light. It might not always be convenient for a user to position the bar code reading and/or the bar code so that the light is reflected back along the same path in that way. Secondly, locating everything within the same unit means that the unit has to be physically rather large and relatively heavy. Users may not find it easy to operate for long periods.

In the field of laser pointers, it is known to provide small hand held units which users can use at conferences, seminars or the like for pointing purposes. The visible spot of the laser beam, when shone onto a screen, indicates to the audience the point of interest, and enables the lecturer to dispense with the traditional physical pointer. Although modern laser pointers are relatively small and compact, they nevertheless still have to be grasped in the hand of the lecturer, which naturally restricts the lecturer's user of that particular hand. Typically, the laser pointer has to be put down every time the lecturer wishes to do something else, such as to turn over a page in his or her notes, or to operate and overhead projector.

It is a general object of the present invention at least to alleviate some of these problems of the prior art.

It is a further object to provide a portable optical scanning system with improved ergonomics, and which will be easier for a user to operate for long periods.

It is a further object of the present invention to reduce the weight of a portable optical scanning system adapted to be held in the hand of a user, or mounted to the user's body.

It is yet a further object to provide a laser pointer which permits the lecturer greater freedom to use his or her hands without continually having to put down and to pick up the pointer.

It is yet a further object to provide an easy to operate and convenient to user laser pointer.

It is yet a further object to provide a laser pointer which can optionally be used as part of a portable scanning system.

Additional objects, advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields which are within the scope of the invention as disclosed and claimed herein and with respect to which the invention could be of significant utility.

SUMMARY OF THE INVENTION

According to a first aspect of the present invention there is provided an optical system for reading indicia of different light reflectivity comprising:

- an optical module having a light emitter for generating and emitting a light beam for illuminating an indicia to be read; and
- a first peripheral module, housed separate and apart from said optical module, having a light detector for detecting the reflection of light from said indicia and producing electrical signals responsive to the light received.

The system may, but need not, be a scanning system in which the light beam scans the indicia to be read. Alternatively, the light beam may be merely illuminating; in that case the light detector may preferably be a CCD detector.

In a preferred embodiment, the optical module incorporates or forms part of a ring which is desirably worn on an index finger of the user. To scan the indicia, the user points his or her index finger in the relevant direction. In some embodiments, an automatic scanning mechanism may be incorporated within the module, so that the emitted beam automatically scans back and forth across the indicia (either in a two-dimensional scan or in a one-dimensional scan) even when the module is held stationary. In other embodiments, however, no automatic scanning mechanism is provided, and the emitted light beam emerges in a fixed direction from the module. In those embodiments, the user scans the beam across the indicia to be read by manually moving the module, typically by moving his or her arm back and forth or by a twisting movement of the wrist.

Switching means may be provided for actuating the optical module. Preferably, these may comprise a switch or button, attached to or forming part of the ring or part of a housing secured to the ring, whereby the user can operate the device merely by pressing the button with his or her thumb. This is particularly convenient when the module is arranged to be worn on the index finger. Alternatively, a pull-cord may be provided which is secured to a second ring, arranged to be worn on a finger of the user's hand adjacent to the finger which is wearing the optical module. By a suitable movement of the fingers, for example by flexing the second finger, the cord is pulled thereby operating the device.

It will of course be understood that there are many other possibilities for actuating the device, including switch mechanisms which operate under voice control, and mechanisms which determine when the user's hand is being moved in a scanning motion.

The first peripheral module which has a light detector for detecting the reflection of light from the indicia, may be either fixedly mounted to a stationary support or alternatively worn by the user. In a preferred embodiment, the first peripheral module takes the form of a wrist watch (or includes a wrist watch), and is worn on the same hand which wears the optical module. In that way, it is relatively easy to ensure that the detector or detectors face in the right direction to receive the reflected light. Alternatively, however, the first peripheral module could be worn on the other arm, or could be secured elsewhere on the user's person, for example on a belt.

The first peripheral module may incorporate radio frequency communication means, enabling the module to communicate with either a fixed base unit or, in some embodiments, a second peripheral module. In one preferred arrangement, the second peripheral module may be worn on the user's other arm. The second peripheral module may also incorporate radio frequency communication means, allowing communication between the second module and the first module, and (preferably at a different frequency) between the second module and a fixed base unit.

The optical module, the first peripheral module and the second peripheral module are all preferably operated by means of portable batteries, desirably relatively compact batteries which can be located within the respective housings.

In further embodiments, the optical module may be adapted to be held in the hand of a user and may be either gun-shaped or pen-shaped. The optical module could also be mounted to a stationary support.

According to a second aspect of the present invention there is provided a system for reading indicia having parts of different light reflectivity, comprising:

a light emitter for generating a light beam which illuminates the indicia and for producing reflected light or variable intensity reflected from said indicia; said light emitter having a housing adapted to be worn on a single finger of a user in a position such that the light beam is directed in a natural pointing direction of said finger; and an optical detector for detecting said reflected light and producing an electrical signal indicative of the reflected light intensity; said detector having a housing adapted to be worn by the user in a position spaced apart from the light emitter.

The light emitter preferably generates a beam which scans the indicia.

A stand or container may be provided to receive the first and/or second peripheral modules when they are not in use. In the preferred form, this may comprise a box (akin to a jewellery box) having recesses for receiving the first peripheral unit in the form of a watch, and a second peripheral unit in the form of a ring. The stand/container may include electrical contacts, which are arranged to abut corresponding contacts on the first and/or peripheral modules, thereby allowing a battery of either or both of the modules to be recharged when the system is not in use. The box may have a lid, and may be lockable, to provide security.

Where the first peripheral module includes a data store, readout data contacts may be provided on the stand whereby the data may be downloaded to a computer automatically or on demand.

According to a third aspect of the present invention there is provided a light pointer module comprising:

a ring adapted to be worn on a single finger of a user;

a housing attached to the ring; and a light emitting means within the housing arranged to generate and emit a light beam, whereby by pointing the finger the user may direct the light beam.

The last pointer may desirably incorporate a trigger mechanism such as the button mechanism or cord mechanism described above.

To enhance the visible effect of the light beam, the light emitting means preferably comprise a visible laser diode (VLD), whose output passes through a collimating optical system. Electronic control means may be provided which maintain the laser output at a predetermined level.

A battery is preferably provided within the housing.

It is within the scope of the present invention for the laser pointer just described to be used in conjunction with the optical scanning system described above.

According to a fourth aspect of the present invention there is provided a light pointer module comprising: a light pointer module comprising:

a portable housing;

a light emitter within the housing arranged to generate a light beam, whereby by pointing the module a user may direct the light beam;

a scanning element for selectively scanning the light beam;

a user-actuable switch in a first position of which the module emits a steady beam and in a second position of which the scanning element is actuated so that the module emits a scanning beam.

According to a fifth aspect of the present invention there is provided an optical system adapted to be worn on the body of a user, the system comprising: an optical system adapted to be worn on the body of a user, the system comprising:

an optical module having a light emitter for generating and emitting a light beam; and a band secured to the module and adapted to be worn around a part of the user's body, the band incorporating a battery for powering the module.

The invention may be carried into practice in a number of ways, and several specific embodiments will now be described, by way of example, with reference to the drawings.

DESCRIPTION OF THE PREFERRED EMBODIMENT

Figure 1A:
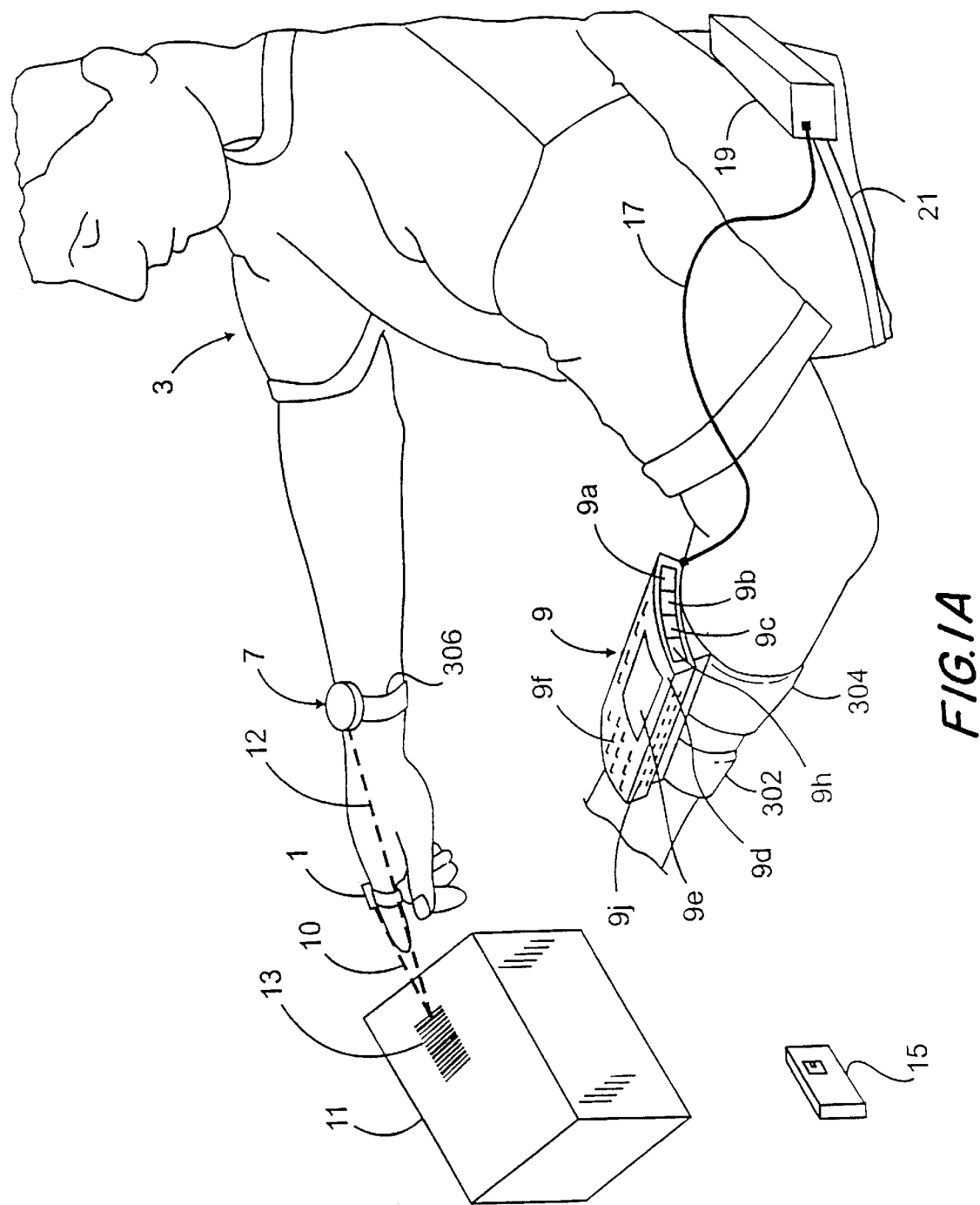
FIGS. 1a and 1b depict a portable optical scan system in accordance with a first embodiment of the present invention.

FIG. 1A shows a portable optical scan system in accordance with a first embodiment of the present invention. An optical scan module 1 is detachably mounted on a single finger of a user 3 using a ring-shaped mounting. The detachable mounting may be of any number of conventional types suitably adapted for its ease of use for the desired application. For example, a ball and flexible socket mounting, or a slide mounting could be used. Other mountings with movable restraining members might also be used.

In additional to the optical scan module 1, the user 3 wears a first peripheral module 7, on the wrist, and a second peripheral module 9 on the other arm. As will be clear from the Figure, the scan module 1 emits a scanning last beam 10 which the user directs toward a bar code symbol 13 to be read. The bar code symbol may be printed on or otherwise attached to on article 11, details of which the user 3 wishes to obtain for example for inventory or for sale purposes. The scanning beam 10 is reflected from the bar code symbol 13, and the reflected light 12 is detected by the first peripheral module 7.

Figure 1B:
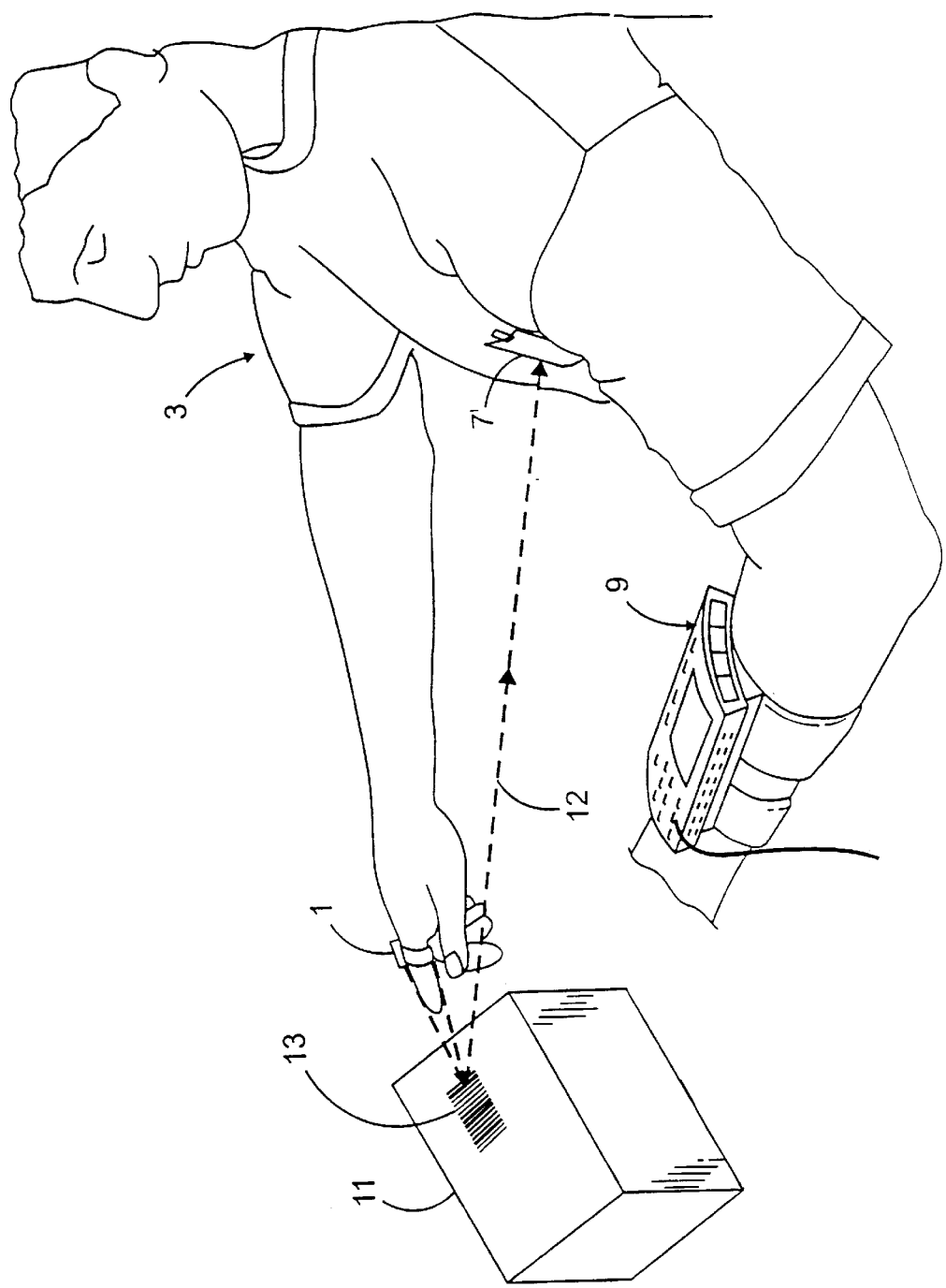

FIG. 1B illustrates a variant of the embodiment of FIG. 1a in which the reflected light 12 returning from the barcode symbol 13 is detected by a peripheral module 7' which is secured to the user's clothing. In the variant shown, the peripheral module comprises a detector which is clipped on to the breast pocket of the user's shirt or shift. Other arrangements (not shown) could of course be envisaged, in which the peripheral module 7' is secured to or forms part of other articles of clothing.

Figure 2:
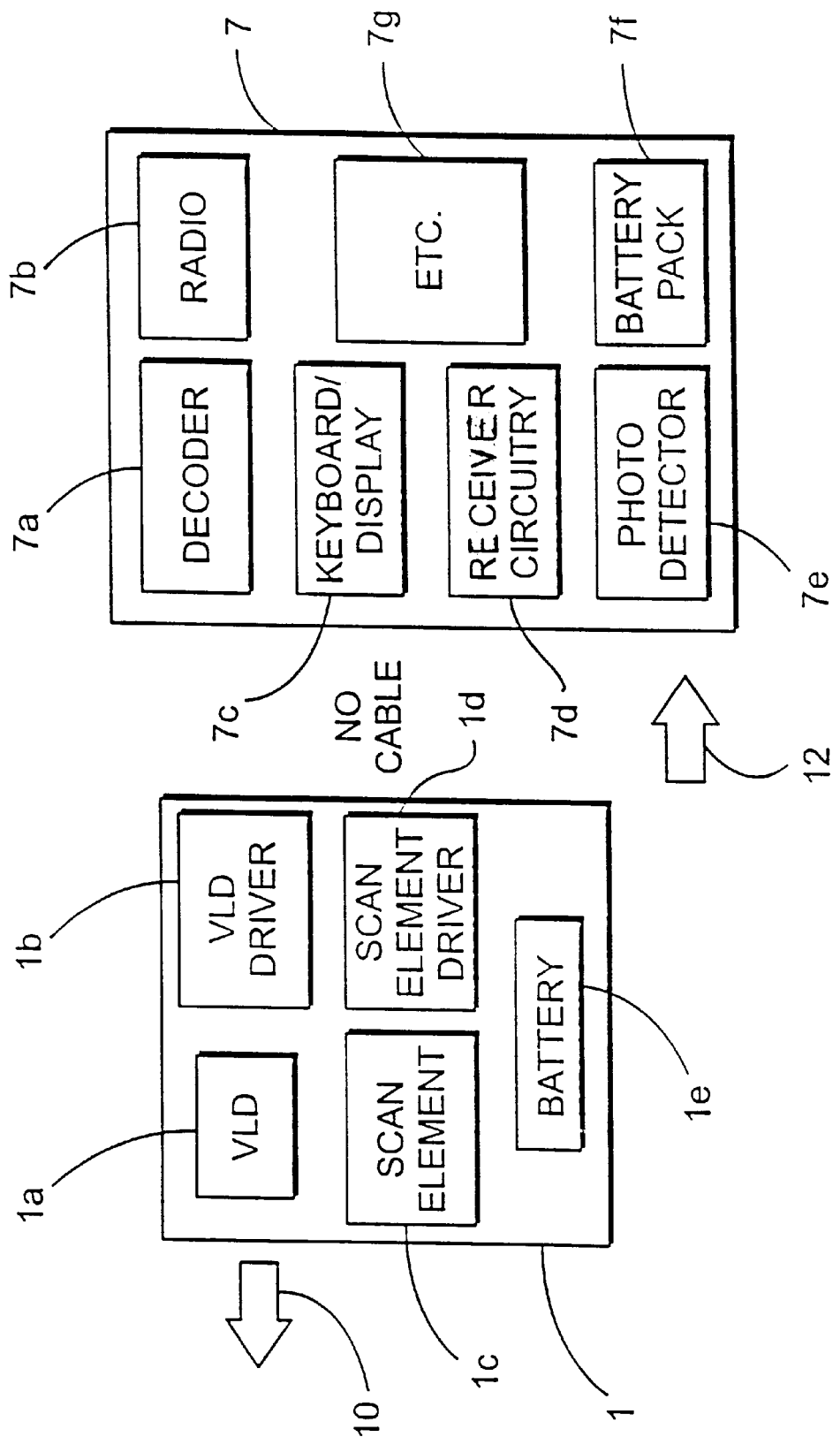
FIG. 2 illustrates schematically the ring unit and the wrist unit shown in FIGS. 1a and 1b.

FIG. 2 illustrates schematically the internal features of the scan module 1 and the first peripheral module 7. The module 1 incorporates a device for generating and scanning the light beam 10, desirably a visible laser diode (VLD) 1a, having a driver 1b. Scanning of the beam 10 is achieved by means of a scan element 1c, and a scan element driver 1d. Power is provided by means of a small battery 1e.

The first peripheral module 7 comprises a photodetector 7e and receiver circuitry 7d which are together arranged to detect the returning light beam 12. The output from the receiver circuitry is passed to a decoder 7a which is arranged to reconstitute the alphanumeric information which the bar code symbol 13 represents. The first peripheral module may also include a keyboard and/or display 7c along with other possible features 7g such as for example a time display so that the module 7 doubles as an ordinary watch when it is not in use as part of the optical scan system. A radio frequency (RF) or other wireless transmitter 7b, along with a battery pack 7f or other power supply completes the unit.

In use, the decoded information emanating from the decoder 7a is passed by wireless link from the radio 7b to the second peripheral module 9 which is located on the other arm or wrist of the user. The radio transmitter 7b could be a transceiver which is also capable of receiving signals from the second peripheral module 9 or from a separate base station 15.

The second peripheral module 9 incorporates a radio receiver 9a and a radio transmitter 9b for communicating with the first module 7 and/or with the base unit 15. Typically, the respective transmission frequencies will be different. The second peripheral module 9 further includes digitizing and processing circuits 9c which convert the transmitted analog signal to a digital signal and decode the signal in a conventional manner. An indicator light, beeper or audio transducer 9d signals the user when the decoding has been satisfactorily accomplished. Such notice could also or alternatively be provided by information displayed on a display unit 9e. A memory storage device 9h is also preferably included for temporary storage of the decoded data. A keypad 9f and/or touch screen may be used for inputting data to the system. A battery 9j is provided to supply power to the secondary peripheral module. Alternatively, or in addition, power may be supplied via an external lead 17 from a separate power supply 19 which is secured to the body of the user, for example on a belt 21.

Depending upon the preference of the user, the second peripheral module could be worn on the right arm, or wrist, like a watch (and in fact, may function as a watch) and the optical scan module 1 and the first peripheral module on the left. In an alternative embodiment (not shown) the second peripheral module 9 could be dispensed with, with all the features of that unit instead being incorporated within the first peripheral module 7. This would of course be expected to make the first peripheral module rather larger than is shown in the drawing.

It will be noted that in the arrangement shown in FIGS. 1A and 1B, there is no cable or other physical connection between the optical scan module 1 and either of the first or second peripheral modules. This improves the wearability of the system, and the likely user acceptance. It is also rather safer, since the lack of wires means that there is less to get caught as the user moves around, perhaps undertaking a variety of different tasks while wearing the devices shown.

Figure 5:
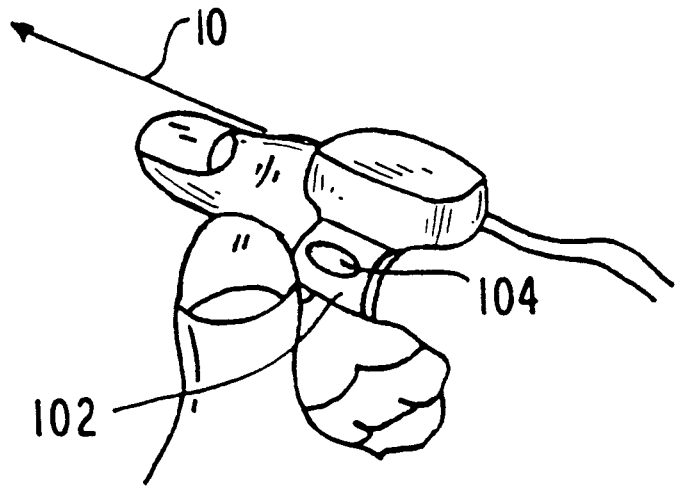
FIG. 5 shows details of the last pointer of FIG. 4.
Figure 6:
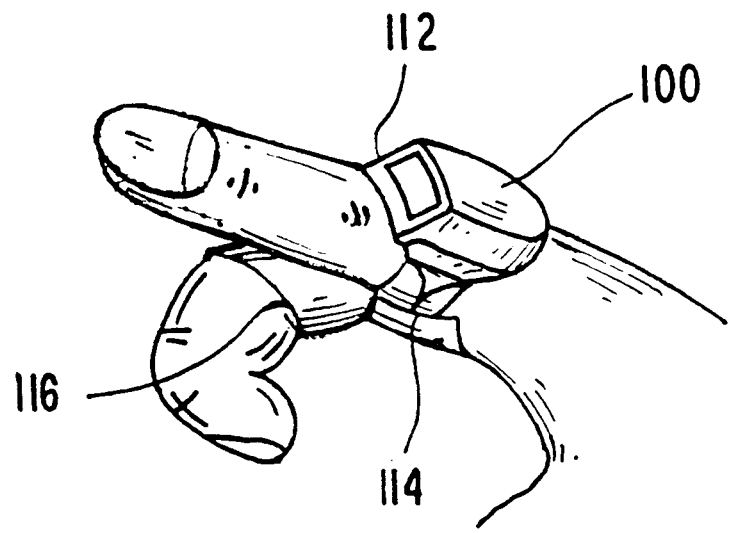
FIG. 6 illustrates the triggering mechanism which may be used with the last pointer of FIG. 4; or with either of the portable optical scan systems of FIGS. 1 or 3.

In a variation of the embodiment described above, the scan element 1c and the scan element driver 1d may be omitted from the optical scan module 1, so that the beam 10 is essentially a fixed beam. With such an arrangement, the user would then physically move his or her hand or arm, thereby manually scanning the beam 10 across the bar code symbol 13. Such an arrangement has the advantage that the module 1 can be reduced in size and in weight, not only by elimination of the mechanical and electronic scanning features, but also because the battery 1e may substantially be reduced in size. A suitable module for use with this variation is illustrated in FIGS. 5 and 6, which will be described in more detail below.

Figure 3:
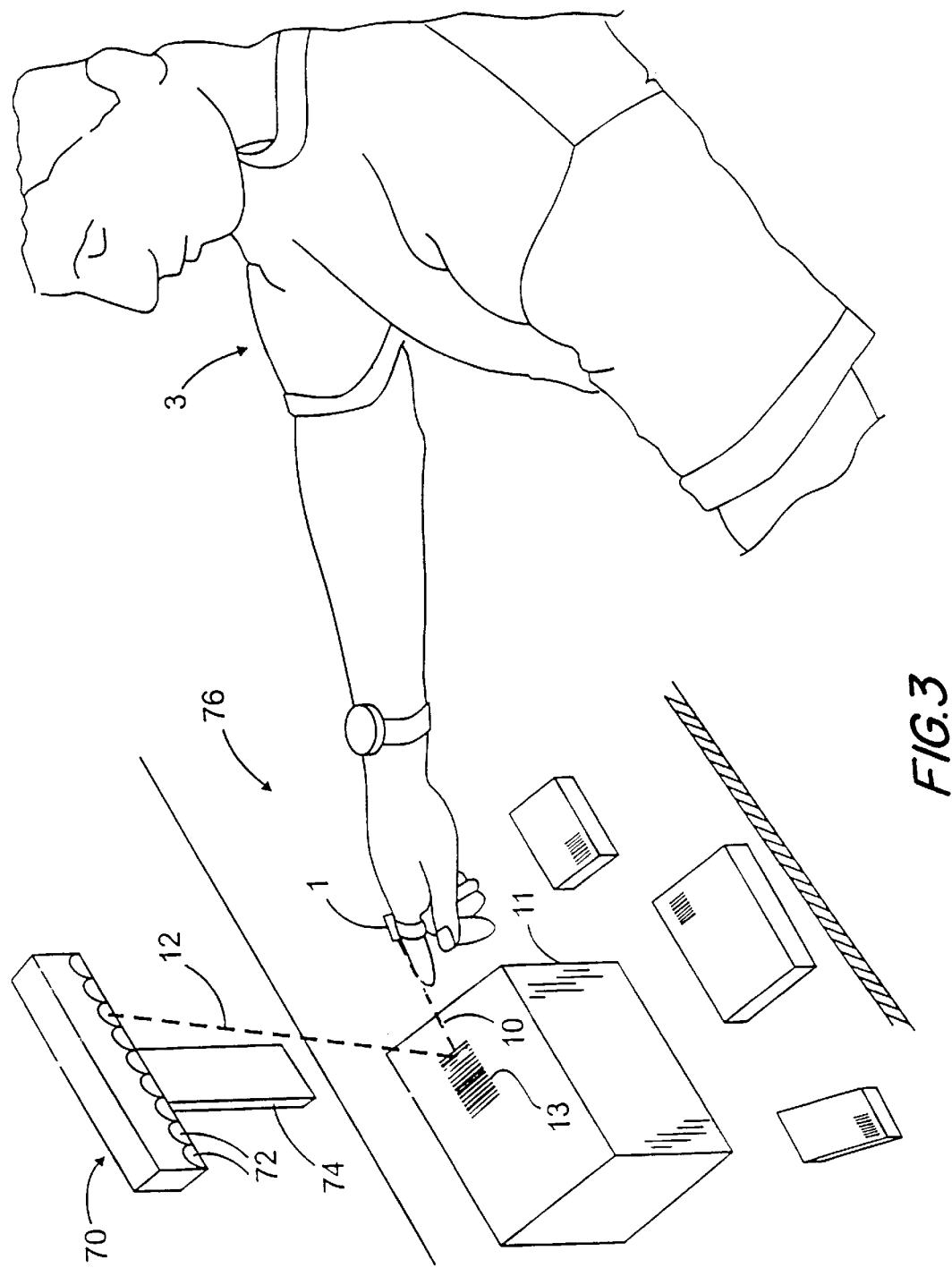
FIG. 3 depicts a portable optical scan system in accordance with a second embodiment of the present invention.

A second embodiment of the invention is shown schematically in FIG. 3. In this embodiment, the light 12 which is reflected from the bar code symbol 13 is detected by a separate detector unit 70 which look down o the surface of the article 11 so as to detect the reflected light. The detector unit could be mounted to a stand 74 which is positioned adjacent a conveyor 76 along which the item 11 is passing. Alternatively, the detector unit 70 could be mounted in or secured to a cash register, could be mounted to the ceiling, or may be suspended from the ceiling by a cable similar to a hanging lamp, or could be mounted within a tunnel which surrounds or at least partially surrounds the conveyor.

In this embodiment, the optical scan module 1 is preferably the same as the scan module illustrated in FIGS. 1A and 1B and 2, with or without the scan element 1c and the scan element driver 1d. If these are not provided within the module, the user has to manually scan the beam 10 across the bar code symbol 13 to be read. As a further alternative (not shown) a hand held pointer or hand held scanner could instead be used, but in each case the detectors are fixedly mounted over the scanned surface.

Figure 4:
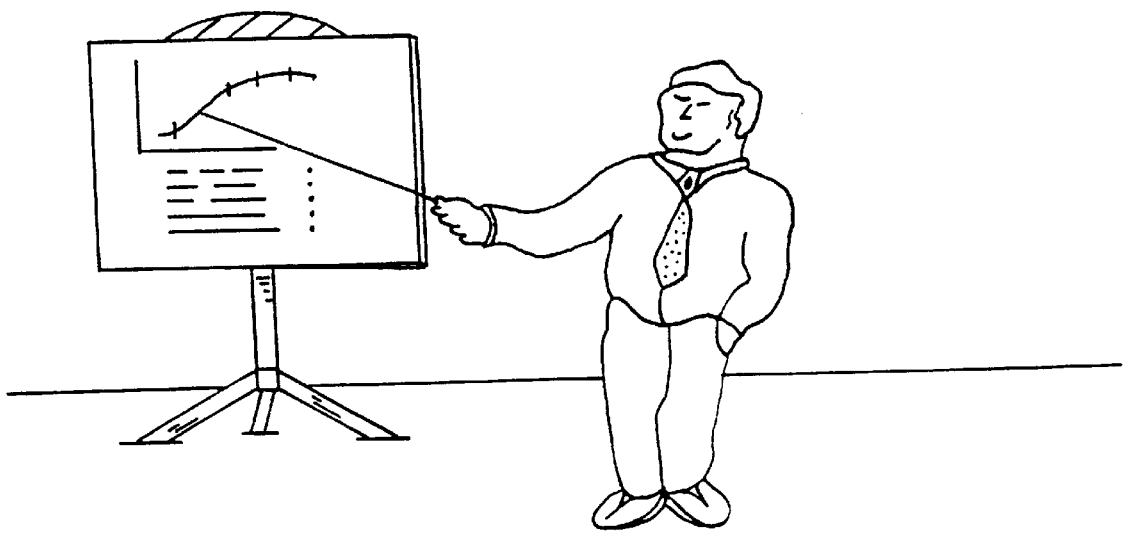
FIG. 4 depicts a laser pointer in accordance with a third embodiment of the present invention.

In those cases in which the optical scan module 1 does not incorporate a beam scanning mechanism, the module 1 effectively becomes a ring-mounted laser pointer. Such a pointer may, as previously described, be used for scanning applications merely by scanning the beam manually across the indicia to be detected, and providing separate detectors elsewhere, either fixedly mounted or secured to the body of the user, which detect the reflected beam. However, a laser pointer of this type is not necessarily restricted to scanning applications, and as may be seen from FIG. 4 the laser pointer could instead be used at lectures, seminars, meetings and so on, or indeed at any type of public presentation.

Reference should now be made to FIGS. 5 and 6 which illustrate certain preferred features of the laser pointer. The embodiment shown in FIGS. 5 and 6 is equally applicable both to the application of FIG. 4 and the application of FIGS. 1A, 1B and 2.

The laser pointer 1 comprises a ring or shank portion 102, adapted to be worn on the finger of the user, to which is secured an upper housing portion 100. Within the housing if a battery which provides power to a visible laser diode (VLD) or other light source. The VLD is mounted to a metal holder/heat sink. Light generated from the VLD passes through an optical system comprising a plurality of lenses, out through an exit window 112. The optical system preferably provides that the beam 10 is collimated or at least quasi-collimated. Electronic circuitry is provided which maintains the laser output at a predetermined level, and also acts as a trigger mechanism.

A trigger button 104 is provided on one side of the ring 102, where is can be actuated by the user's thumb. In this way, the user can easily switch the laser beam on and off.

Another alternative and/or additional switching mechanism may be provided by means of a separate ring 116 which is attached to the user's middle finger and which is secured to the ring 102 by means of a cord 114. As is shown in FIG. 6, the user may operate the device by flexing the middle finger, and so pulling on the cord. This could be done either by bending the middle finger with respect to the index finger, or by pulling the middle finger away from the index finger.

A device of this sort is both easy and convenient for a lecturer to wear, and it also allows free use of the hand at all times. Because the ring is preferably mounted to the index or forefinger, pointing accuracy is likely to be increased.

An alternative and/or additional switching mechanism may be provided by the use of a limited range proximity sensor. Reference is made to U.S. Pat. No. 5,280,162 which is hereby incorporated by reference, as describing "object sensing" or proximity sensing technology in a bar code reader. By appropriate setting of threshold signals in the circuits of such a system, the sensor may be made to trigger by a movement of the thumb, or by more distant object embodiment of a "self triggering" mode which will be described in connection with FIGS. 11 and 12 in more detail. Another embodiment utilizes a very small range proximity sensor, so that the unit will not be triggered by a distant target, but only the user's thumb. In that embodiment, there is a very limited range proximity embodiment which provides a limited range proximity sensor located on the front or side surface of the ring 102. When the user wishes to turn the unit on, a slight movement of the thumb closer to the index finger will switch the unit on, thus avoiding the effort required for the thumb to press a trigger switch.

Figure 7:
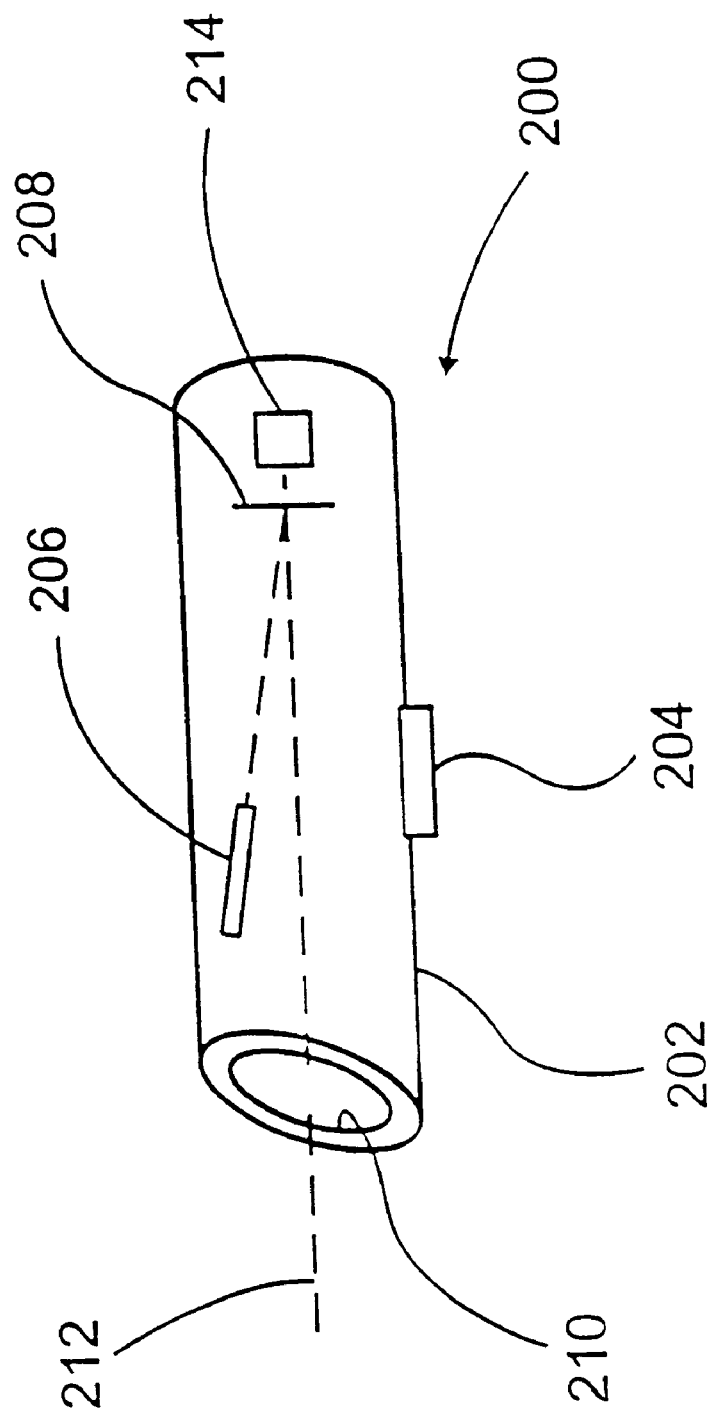
FIG. 7 illustrates a hand-held laser pointer/laser scanner of another embodiment.

FIG. 7 illustrates, schematically, a hand-held laser pointer 200 which is capable either of providing a fixed laser beam, for pointing purposes, or a scanning laser beam. Whereas a fixed laser beam generates a point or dot, that can be aimed at a screen, a scanning beam generates a line or circle. This especially convenient if the user wishes to underline or to circle a sentence or a figure that is being pointed to.

The pointer shown in FIG. 7 incorporates a hand-held body 202, having a manually actuable multi-positioned switch 204. Inside the body 202 there is a short wavelength VLD (visible laser diode) 206 which directs a beam onto a small, micro-machined mirror 208. This deflects the beam out of a window 210 in the housing, thereby providing a pointing beam 212. A scanning element 214 is provided for selectively oscillating the mirror 208, thereby causing the beam 212 to be scanned.

In a first position of the switch 204, the laser diode 206 is switched off, and no beam is produced. In a second position, the laser diode is switched on and is reflected from the stationary mirror 208, thereby providing a fixed pointing beam 212. In a third position of the switch, the scanning element 214 is actuated, causing the beam 212 to be scanned, thereby generating a visible line on the surface that is being pointed to. In the preferred embodiment, the scanning is in one dimension so that the resultant line on the screen is straight. In an alternative embodiment, however, the scanning element 214 could cause the beam 212 to be scanned in two directions, thereby forming any desired type of lissajous, such as a circle, on the screen. More complex scanning arrangements could also be envisaged, so that for example the image projected onto the screen is a square or other desired figure.

If the trigger 204 is a multi-position trigger, the device could provide a projected straight line in one position of the trigger, and a projected circle in another position. Different positions of the trigger could also provide different lengths of line and/or different sizes of circle or other images that are being projected.

Scanning of the beam 212 of course reduces the visibility of the image with respect to the visibility of the dot generated by a fixed beam. To compensate, the laser output power is increased according to the position of the trigger 204.

Instead of being hand-held, the device shown in FIG. 7 may be built into a ring, and in particular it may be built into any one of the rings that have previously been described. Naturally, in such a case, the trigger 204 will be replaced with an appropriate trigger or switch on the ring itself. For example, if the arrangement of FIG. 7 is built into the ring shown in FIG. 6, the trigger 204 is merely replaced by the trigger button 104 (FIG. 6A) or the cord 114 (FIG. 6B). It will of course be appreciated that, where appropriate, the button and/or cord may be multi-position. Alternatively (not shown) there may be several separate switches, one of which for example produces a fixed beam and another of which produces a scanning beam.

Batteries for wearable devices of the types which have already been described typically occupy a significant proportion of the device's volume, and additionally contribute to its weight. Where substantial power is required, such as for example the devices illustrated in FIGS. 1 to 3, a separate battery pack 19 is often the most convenient way to provide the power that is needed. However, in a variation of the embodiments previously described, power may instead or in addition be provided by a thin flexible battery which forms part of the band that wraps around the arm, wrist or finger of the user. Specifically, in FIG. 1A the wrist band 306 could be such a battery, as could be the arm bands 302,304. In FIG. 5, the ring 102 could be a battery.

Preferably, the battery is of the lithium polymer rechargeable type, which is simply cut into the appropriate shape. Such batteries may provide sufficient power, on their own, for operation of some devices; in other cases, they may be used as an auxiliary battery, thereby reducing the size of the additional cells that may be necessary.

Figure 8:
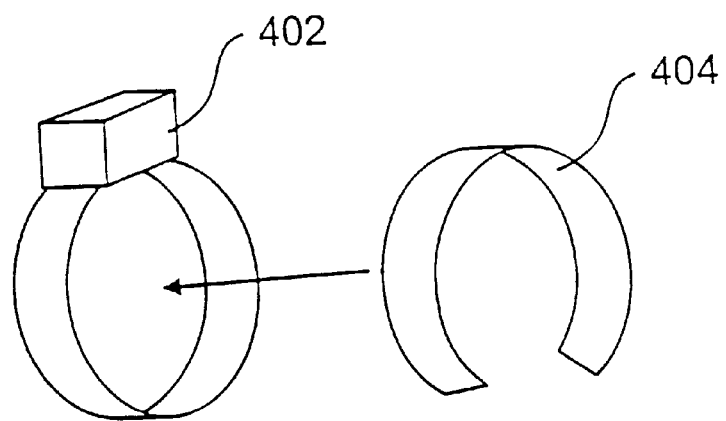
FIG. 8 shows schematically yet a further embodiment in which a band for securing a pointer or scanner to the user's body comprises a flexible battery.

FIG. 8 illustrates the concept in schematic form. A flexible battery strip 404, preferably a lithium polymer battery, is formed into a ring shape and is attached to a scanner and/laser pointer 402. Depending upon the size of the device, the band 404 may fit around a finger, a wrist or an arm of the user.

Figure 9:
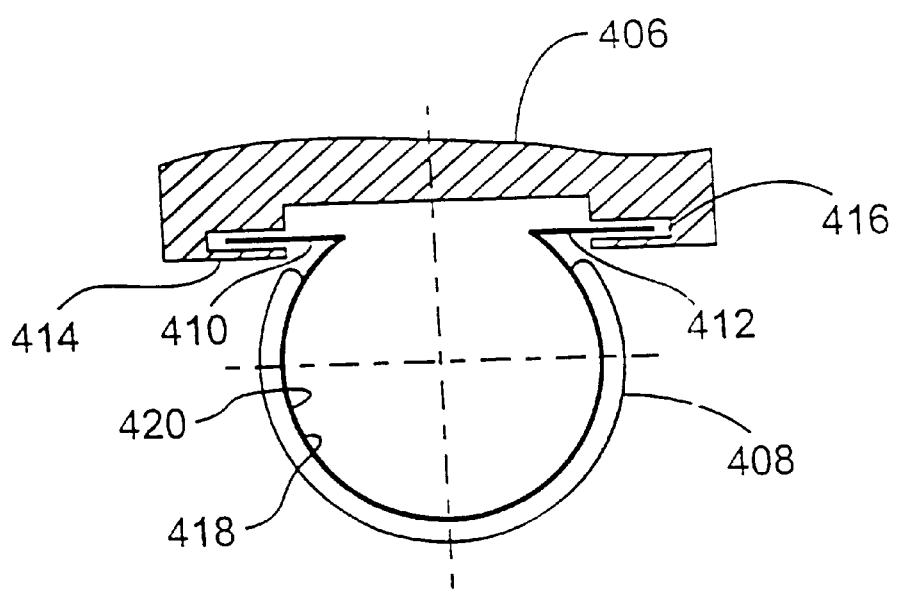
FIG. 9 represents a practical embodiment of the device shown in FIG. 8.

FIG. 9 illustrates a practical embodiment in more detail. A flexible battery strip 408 is attached to two circularly-shaped snap springs 418,420. One snap spring 418 is attached to the positive battery terminal, and the other 420 to the negative battery terminal. At one end of the spring 418 there is a contact portion 410, while at the opposite end of the other spring 420 there is a similar contact portion 412. There fit into corresponding grooves 414,416 in the lower surface of the scanner/laser pointer 406, thereby providing the necessary electrical power.

The exact shape and configuration of the battery and the contacts is not of course critical. In the embodiment shown in FIG. 9, the springs 418,420 could be in the form of thin, sprung wires. Alternatively, they could take the form of flat leaf springs, which extend out of the plane of the diagram. In the first sockets 414,416 in the form of blind bores which receive the contact portions 410,412. Alternatively, where the springs take the form of leaf springs, the contact portions 410,412 may simply be slid into appropriate grooves 414, 416 in a direction perpendicular to the plane of the figure. In either case, the snap springs 418,412 are preferably incorporated within the plastic protective jacket of the battery during the manufacturing process.

To make it easier to put the device on and to take it off, an alternative embodiment (not shown) provides for one end of the battery to be hinged to the underside of the scanner/laser pointer. The other end is secured by an easily-releasible clasp. To put the device on, or to take it off, the user merely releases the clasp and hinges the battery away from the underside of the scanner/laser pointer.

Figure 10:
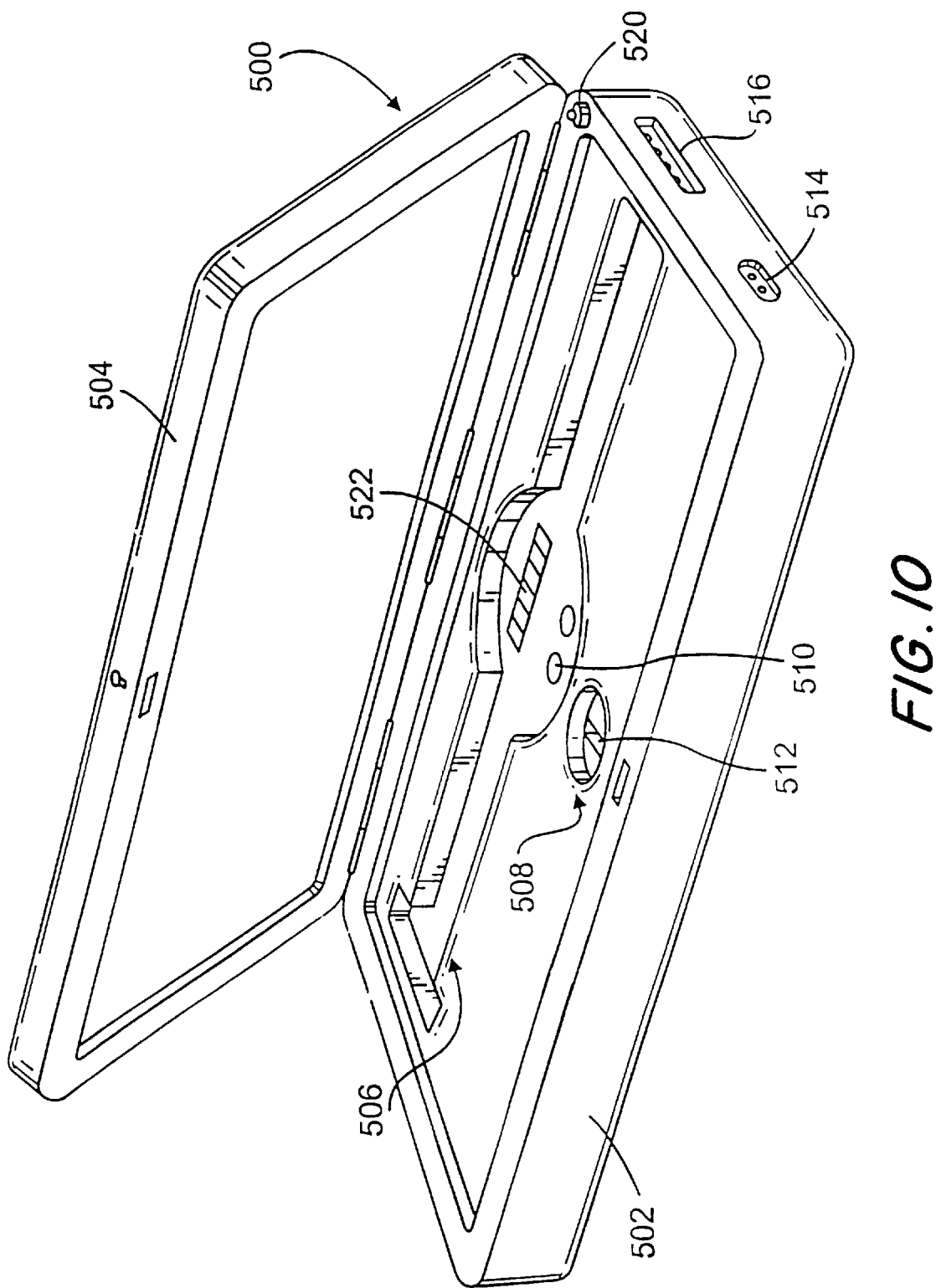
FIG. 10 shows a storage box for use with the portable optical scan system of FIG. 1A.

FIG. 10 shows a storage box 500 which is suitable for use with the system shown in FIG. 1A. The box comprises a base portion 502 and a lockable hinged lid portion 504. Within the base portion 502 there is a first recess 506 for storing the watch 7 (FIG. 1A) and a second recess 508 for storing the ring 1 (also FIG. 1A). In addition to providing convenient and secure storage, the box 500 incorporates a battery charger (not shown) to recharge any battery that may be incorporated within the watch 7 and/or the ring 1. To that end, when the watch is placed within the recess 506, its rear surface comes into contact with electrodes 510. Likewise, when the ring is placed in the recess 508, with the band portion pushed down into a slot 512, it comes into contact with further electrodes (not shown). Power is provided to these electrodes via a mains supply which is plugged into a socket 514 on the outside of the box. The electrodes become live, thereby recharging the batteries (for example overnight) when the lid 504 is closed, thereby closing a microswitch 520.

In some embodiments, the watch 7 of FIG. 1A may be used to store data, and may accordingly have a memory chip inside it. When the watch is placed in the recess 506, an electrical contact on its rear surface abuts a corresponding contact 522 at the base of the recess. The data within the watch may then automatically be downloaded, or downloaded on request, via a data socket 516 to an external computer (not shown).

SELF TRIGGERING MODE

Another key feature of the present invention is to implement a variety of adaptable "self triggering" or "object sensing" modes of operation that eliminate the need for a manual trigger switch, and also optimize the turning on of the scanning and bar code reading operation for different ergonomic implementations—fixed mount, hand-held (including hand-supported), ring or finger-mounted, body mounted, etc., all of which may require different "turn on" conditions for the user applications envisioned. Reference is first made to U.S. Pat. No. 5,280,162 of the present assignee for background information describing a scanning system operable in a "sleep" mode including object sensing, and a "scanning" mode after sensing an object in the scanning field.

Another prior art design uses an infrared LED which is blinking at a high frequency. A photo detector is connected to analog circuitry that responds to signals at the frequency at which the LED is blinking. When an object with a bar code is placed in front of the scanner, some infrared light is reflected back to the detector. The circuit responds to this by sending a "Trigger" signal to the decoder, which initiates scanning.

Such prior art systems have several drawbacks. The signal detector circuitry adds costs and complexity to the scanner. The LED also consumes power, which is a drawback in battery powered applications. The sensing range varies depending on the size and color of the object being sensed, and it is subject to false triggering which can cause accidental reading and wastes power.

In other prior art self-triggering designs, the laser is turned on for one scan and off for three scans. If during the scan with the laser turned on something resembling a bar code is detected somewhere in the scan field, the laser stays on until either a symbol is decoded or a predetermined time has elapsed. The scanner then resumes blinking the laser.

This is an improvement over the other prior art design since it adds no additional circuitry to the scanner. It is less likely to false trigger because it only turns on when real bar codes or at least things that look like bar codes are detected, and its range inherently matches the range of the scanner, regardless of the size of color of the item being scanned.

However, the blinking laser is visually annoying to some users. Sensing can be sluggish because it can take as much as three scan periods to detect the object (it cannot sense symbols when the laser is off). Accidental reads are still possible because it can sense a symbol anywhere along a wide scan line. Power is still consumed by the laser when it is turned on, and by the decoder which performs a control and monitoring function, and which therefore must be kept turned on to control the blinking and sensing.

Still another prior art design has the laser turned on all the time. Such design is usually not commercially useful since it would too rapidly use up the laser's limited life. It would also heat up the laser and the interior of the scanner housing which would further shorten the laser's life. It would also use a substantial amount of power. Except for the decoder, the laser uses more power than any other component of a hand-held scanning system.

The blinking laser mode is only practical with a very long lived motor, as it requires the motors to run continuously. These motors will not wear out and use so little power that they do not heat up the interior of the scanner.

It has been determined from experimental measurements that blinking the laser on for one out of four scans keeps it cool enough that its lifetime will be satisfactorily long, assuming adequate heat sinking and minimum heat generation by other circuitry.

The present invention provides a way to have the laser turned on only 25% of the time by turning it on every scan, but only for 25% of the scan period. In scanners that run typically at thirty-six scans per second, each scan takes 27.7 milliseconds, so if the laser is turned on for only 6.9 milliseconds in each scan, it will be on 25% of the time. The laser will then have the same lifetime as it would in a scanner that turns the laser on for one out of four scans. The figure 25% is chosen as an example in our discussion, but may be any appropriate percentage for the particular application envisioned.

Figure 11A:
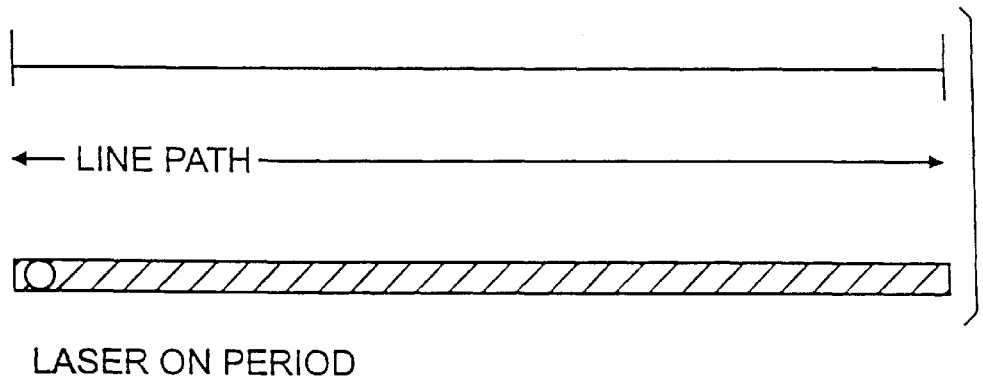
FIGS. 11a and 11b are schematic representations of laser beam scanning patterns as is known in the prior art.
Figure 11B:
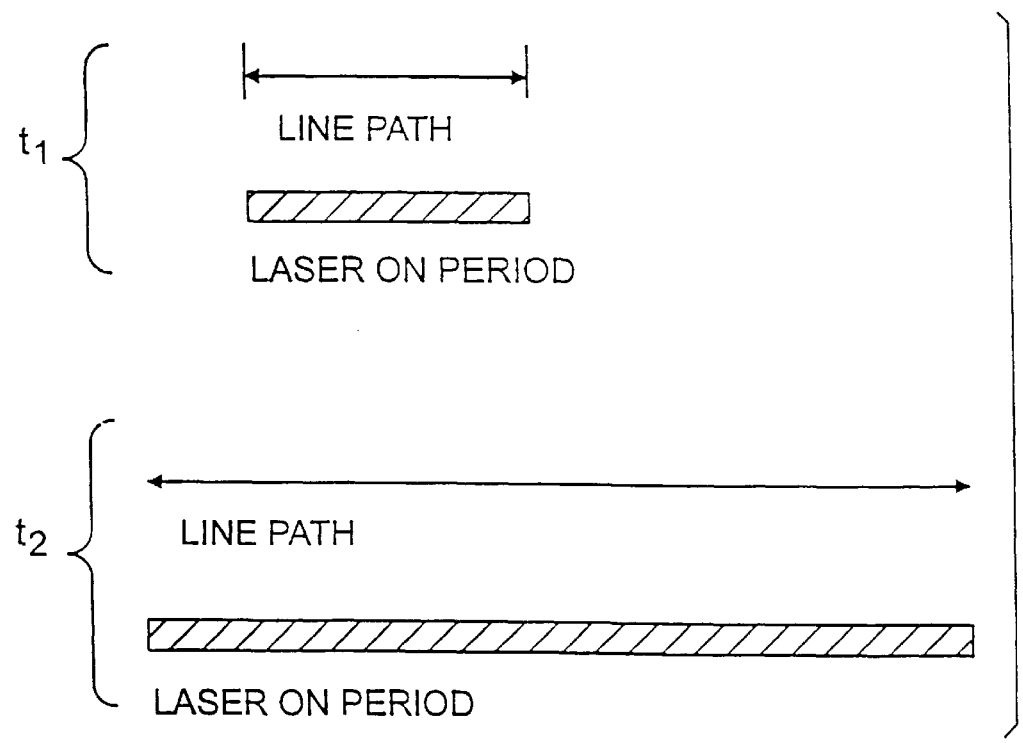
Figure 11C:
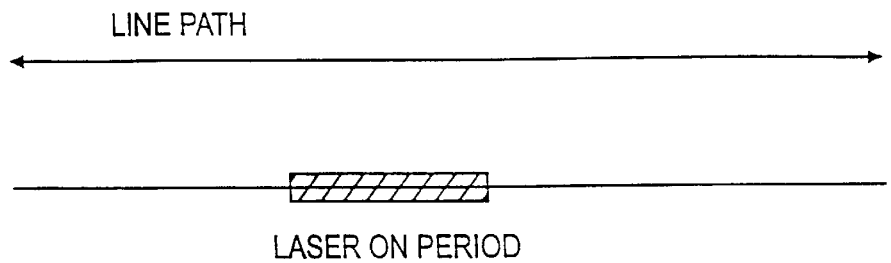
FIGS. 11c, 11d and 11e are schematic representations or laser beam pulsing patterns according to the present invention.
Figure 11D:
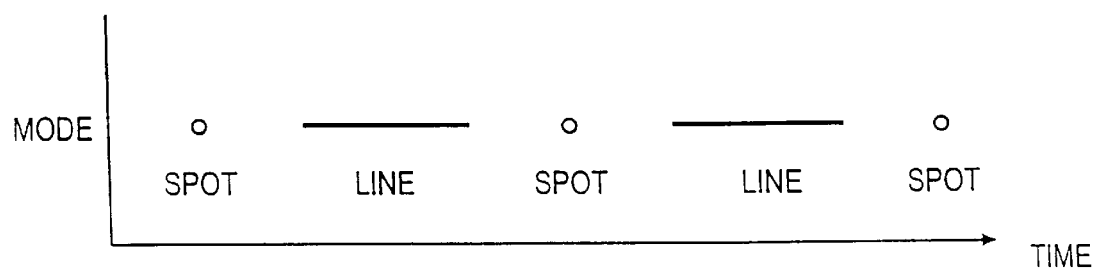
Figure 11E:
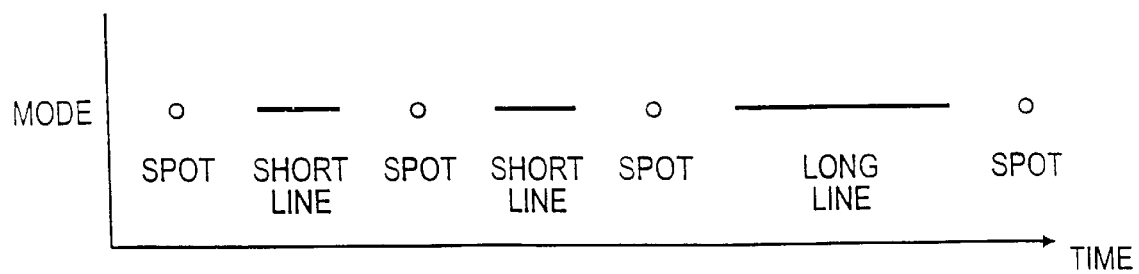

Turning to the Figures, FIGS. 11a and 11b are schematic representations of laser beam scanning patterns as is known in the prior art. FIG. 11b is similar to that in U.S. Pat. No. 4,933,538, wherein $t_2$ is a later time than $t_1$. FIGS. 11c, 11d and 11e are schematic representations of laser beam pulsing patterns according to the present invention. In the preferred embodiment, FIG. 11c, the laser should be turned on in the middle of the scan time so the scanner user will see a short scan line that occurs every scan, instead of a long line every fourth scan. The short line will not appear to blink because thirty-six scans a second is above the frequency at which the human eye can perceive the flickering of a light. Flickering is quite visible with existing bar code readers that blink only nine times per second.

Some care should be taken to assure that the laser is turned on in the center of the scan in both scanning directions. If the blinking is controlled by a microprocessor, preferably the same one that is used for decoding, this is easily accomplished, as follows.

Figure 12A:
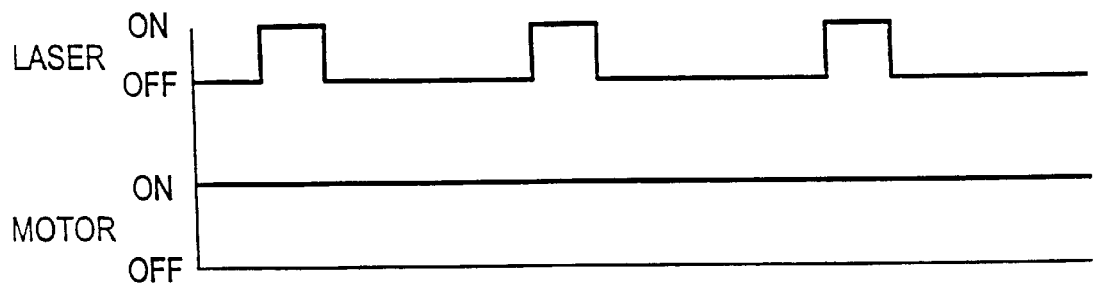
FIG. 12a is the timing diagram of one embodiment of a laser beam pulsing pattern corresponding to FIG. 11c.
Figure 12B:
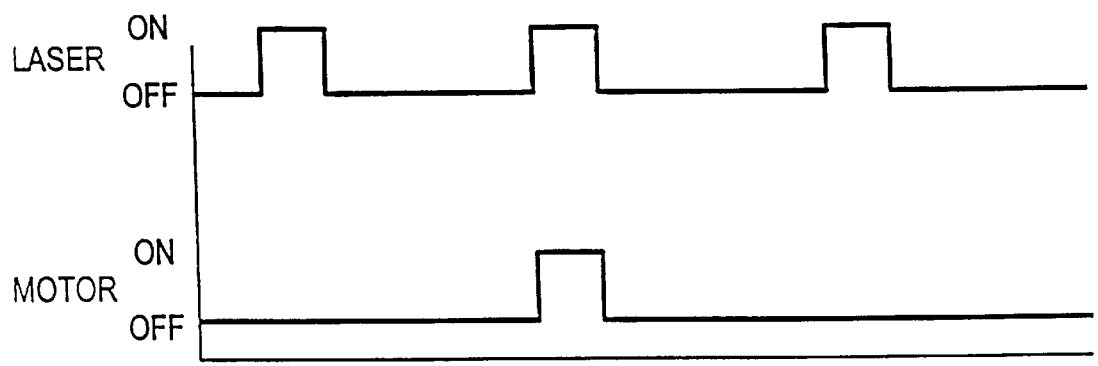
FIGS. 12b and 12c are timing diagrams of other embodiments of the laser beam pulsing pattern.
Figure 12C:
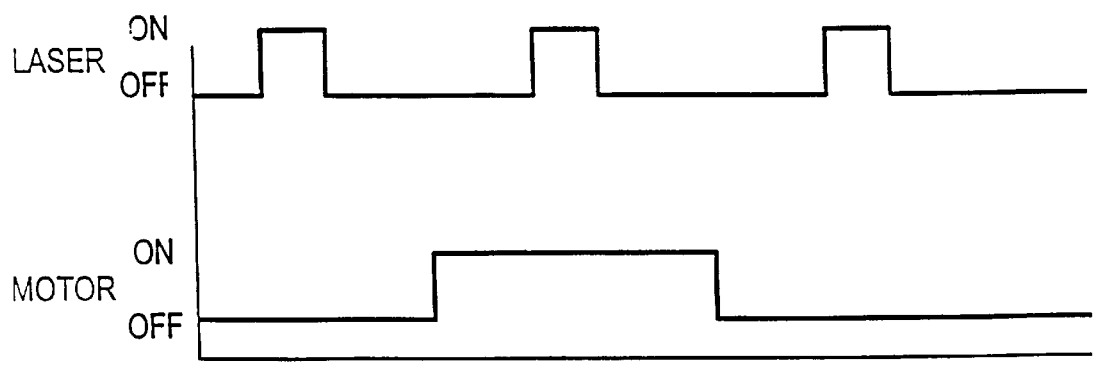

If a scan motor such as described in U.S. Pat. Nos. 5,212,267 and 5,367,151 that runs at its own natural frequency is used, the blinking must be synchronized to the motor because the motor frequency varies a little bit from one motor to another. These patents are hereby incorporated by reference to illustrate a preferred scan motor design for use with the present invention. This can be done using the start of scan (S.O.S.) signal that is provided by the motor drive circuitry. The S.O.S. signal is derived from a feedback signal generated by the motor, so it is always synchronized with the motor. The S.O.S. signal is high when the motor is traveling in one direction and low when it is traveling in the other. High to Low or Low to High transitions occur when the motor changes direction at the end of each scan. The laser turn-on can be controlled as set forth in the timing diagram of FIGS. 12a, 12b, and 12c. FIG. 12a is the timing diagram of the embodiment of a laser beam pulsing pattern corresponding to FIG. 11c; and FIGS. 12b and 12c are timing diagrams of alternative embodiments of the laser beam pulsing pattern. These are two types of timing errors that occur with the start of scan signal that should be taken into account when the S.O.S. signals are used to synchronize the laser blinking with the motor. The start of scan is not always symmetrical. Sometimes, for example, a motor might take twenty-seven milliseconds to scan left to right and twenty-eight milliseconds to scan right to left. In addition, the S.O.S. transitions typically do not correspond exactly with the time that the motor reverses direction. The S.O.S. transitions are typically delayed by about one or two milliseconds, depending on the sensing circuitry used.

These variations can be corrected for by the microprocessor that controls the blinking as follows. When power is first applied to the scanner software in the decoder will measure the scan time in each direction using the start of scan signal. For each direction, the decoder then calculates the value equal to three eights of the measured scan time. The software routine then subtracts from this value the number of milliseconds by which the start of scan signal lags behind the actual turn around moment of the motor (typically 1–2 milliseconds). The signal lag number must be determined from both the design of the particular type of motor and drive circuit being used. The signal lag will be approximately the same for all units of a given design.

When a start of scan transition occurs, the decoder waits the amount of time calculated above for the particular scan direction that is beginning. It then enables or turns on the laser for 25% of the measured scan time. This process is repeated every time the start of scan signal transitions, indicating the start of a new scan. Additional corrections for such things as slow response of the laser control circuitry can be made as necessary.

When all of the above is properly implemented, a scan line that is shorter than the full scan line will be visible that is centered with respect to the full scan line. This short line will be illuminated in both left to right and right to left scans. Although the laser is on for only 25% of the scan time, the visible scan line will be longer than 25% of the total scan line because the beam moves fastest in the center of the field. Experiments show that, in a typical scanning system with a resonant motor, the short scan line will be about 33% as wide as the full scan line, even though the laser is only on 25% of the time.

As described above, the present invention provides an optical scanner for reading bar code symbols on a target at a distance from the unit, including scanning means for generating a laser beam directed toward a target producing a pulsed relatively short image line on the target plane during a first time period and a substantially continuous wide angled laser beam that sweeps an entire symbol during a second time period for reading the symbol, and detection means for receiving reflected light from such symbol to produce electrical signals corresponding to data represented by such symbol. The first and second time periods cyclically repeat during normal operational use.

This system is used to sense symbols as follows. When power is applied to the scanner it begins blinking the laser as described above. The user aims the visible shortened scan line at the symbol to be scanned, or if the scanner is stand mounted, positions the symbol under the visible shortened scan line.

When the scan line crosses a symbol or part of a symbol, the scanner can try to decode the symbol. If it fails, the laser can be turned on for the full scan time for the next few seconds or until a decode has occurred, at which time the short scan line returns. Multiple decodes of the same symbol can be prevented by programming the decoder not to decode the same symbol again until it is out of view for a while (typically 0.5 to 1 second).

This self triggering means has the following advantages. It does not appear to flicker because it blinks above the flicker perception frequency. It reduces the possibility of accidental triggering because it will only sense an object that looks like a bar code and only when it is centered in the scan field. It adds nothing to the circuit complexity and provides easier aiming than an invisible Intra-Red Sensor. It is usable for hand-held, fixed mounted or wearable scanners. It is faster responding than blinking the laser one out of four scans because it can sense a symbol every scan, as opposed to every fourth scan.

Additional refinements can be used to further reduce power consumption. If necessary, the laser can be turned on for 25% of a scan time every other scan or even every third or fourth scan. This may result in visible flicker, but it might be acceptable in battery powered applications. In addition, the laser can be modulated at a high frequency during the sensing period. This can reduce its power consumption by half during its "On" Time.

With these measures, the scanner (excluding decoder) can operate in its sensing mode at an average current of less than ten ma. This assumes that one of the commercially available visible laser diodes that operate at around thirty ma is used. If it is blinked on for 25% of every fourth scan its average current draw will be 1.875 ma. If it is modulated at 50% duty cycle during its "On" Time, its average is 0.937 ma. Resonant motors we make today operate at 0.5 ma. With care analog circuitry including amplifiers, digitizer, motor control, and laser regulator have been built that use less than 8 ma for a total of 9.43 ma (all at 3 to 5 volts).

Sometimes it is desirable to have a triggerless scanner that has no on-board decoder. Ideally, it should be compatible with existing decoders that are made for hand-held scanners. Presently, a decoder has software that controls the laser blinking if this is to be done. This makes it impossible to connect triggerless or to use Intellistands with decoders. This problem can be avoided if an inexpensive microprocessor is used to control laser blinking and symbol sensing in a decoderless scanner.

There are small microprocessors available that can perform the blinking control as described above. The same microprocessor that blinks the laser can monitor the output of the digitizer during the time the laser is blinked on. If it detects a sufficient number of elements being digitized to indicate that a symbol might be present, it can generate a simulated trigger pull signal that will signal the remote decoder that a symbol is present, just as if someone pulled a trigger. When the symbol is removed, the "trigger" will be automatically released.

The example of a 25% is used as an appropriate blink duty cycle. Higher duty cycles can of course be used if long lived lasers are used or lifetime requirements are modest. Scanners that never operate in hot environments can also operate at higher duty cycles. Lower duty cycles can be used to reduce power consumption or if the scanner is to operate in a hot environment.

The duty cycle can be user selectable by programming the reader, or by scanning special bar codes. This makes it easy to match the scanner to the environment.

Although the present invention has been described with respect to reading bar codes, including stacked, or two dimensional bar codes such as Code 49, PDF 417 and similar symbologies, it is conceivable that the method of the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the entire scanner to be fabricated as a single printed circuit board or integral module. Such a module can interchangeably be used as the laser scanning element for a variety of different types of data acquisition systems. For example, the module may be alternately used in a ring, hand-held or body-mounted scanner, a table top scanner attached to a flexible arm or mounting extending over the surface of the table or attached to the underside of the table top, or mounted as a subcomponent or subassembly of a more sophisticated data acquisition system. Control or data lines associated with such components may be connected to an electrical connector mounted on the edge or external surface of the module to enable the module to be electrically connected to a mating connector associated with other elements of data acquisition system.

An individual module may have specific scanning or decoding characteristics associated with it, e.g. operability at a certain working distance, or operability with a specific symbology or printing density. The characteristics may also be defined through software or by the manual setting of control switches associated with the module. The user may also adapt the data acquisition system to scan different types of articles or the system may be adapted for different applications by interchanging modules on the data acquisition system through the use of a simple electrical connector.

The scanning module described above may also be implemented within a self-contained data acquisition system including one or more such components as keyboard, display, printer, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a portable or stationary receiver or base station.

It will be understood that each of the features described above, or two or more together, may find a useful application in other types of scanners and bar code readers differing from the types described above.

While the invention has been illustrated and described as embodied in it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed is:

1. In a system for reading bar code symbols, a combination comprising:
    a) an optical scan module supportable by a user during reading, and operative for scanning a bar code symbol to be read with a laser beam;
    b) a peripheral module also supportable by the user during reading, and operatively connected to the scan module for detecting laser light reflected off the symbol and for producing and electrical signal responsive to the detected laser light; and
    c) a storage unit having a first compartment for receiving the scan module, and a second compartment for receiving the peripheral module, when the modules are not supported by the user.

2. The combination of claim 1, wherein the scan module includes a housing, a ring-shaped mounting connected to the housing and worn on a finger of the user, a laser source in the housing for emitting and directing the laser beam toward the symbol to be read, and a scan element in the housing for sweeping the laser beam in a scan across the symbol.

3. The combination of claim 2, wherein the scan module includes a battery in the housing for supplying electrical energy to the laser source and the scan element.

4. The combination of claim 1, wherein the peripheral module includes a casing, a body mounting connected to the casing and worn on a part of the body of the user, and a photodetector in the casing and operative for detecting the laser light over a field of view.

5. The combination of claim 4, wherein the body mounting includes a wrist strap.

6. The combination of claim 4, wherein the peripheral module further includes a wireless transmitter, and a battery for supplying electrical energy to the photodetector and the transmitter.

7. The combination of claim 1; and further comprising an auxiliary module also supportable by the user during reading, and operative for processing the electrical signal; and a wireless transmitter for transmitting the electrical signal between the peripheral and auxiliary modules.

8. The combination of claim 1; and further comprising an auxiliary module also supportable by the user during reading, and operative for processing the electrical signal; and a keypad and a display located on one of the peripheral and auxiliary modules.

9. The combination of claim 1, wherein each module has an exterior periphery, and wherein each compartment has an interior periphery of complementary contour to the exterior of each module.

10. The combination of claim 9, wherein the peripheral module includes a generally circular casing an a pair of side straps connected to, and extending in opposite directions from opposite lateral sides of, the casing; and wherein the second compartment has a generally circular recess for snugly receiving the casing, and a pair of side recesses for snugly receiving the side straps.

11. The combination of claim 1, wherein the storage unit includes a base in which the compartments are located, and a lid movable between an open position in which the compartments are accessible to the modules, and a closed position in which the lid covers the compartment.

12. The combination of claim 11, wherein each module contains a rechargeable battery, and wherein each compartment contains an electrical recharging contact through which an electrical current flows to recharge each battery when the modules are received in the compartments.

13. The combination of claim 12, wherein the storage unit includes a recharging socket and a switch actuated by movement of the lid to the closed position, the switch being operable to conduct the electrical current from the recharging socket to the contact in each compartment.

14. The combination of claim 1, wherein the peripheral module contains a memory component for storing data, and wherein the second compartment contains an electrical download contact through which the data is downloaded after reception of the peripheral module in the second compartment.

15. The combination of claim 14, wherein the storage unit includes a download socket through which the data is automatically downloaded.

16. The combination of claim 14, wherein the storage unit includes a downloaded socket through which the data is downloaded upon request from an external host device.

17. In a system for collecting data, a combination comprising:
    a) a collection module supportable by a user during data collection, and operative for collecting data;
    b) a data processing module also supportable by the user during data collection, and operative for processing the data collected by the collection module, the data processing module including a wireless transmitter, and a battery for supplying electrical energy to the transmitter; and
    c) a storage unit having a first compartment for receiving the collection module, and a second compartment for receiving the data processing module, when the modules are not supported by the user.

18. The combination of claim 17, wherein the collection module includes a housing and a ring-shaped mounting connected to the housing and worn on a finger of the user.

19. The combination of claim 18, wherein the collection module includes a battery in the housing for supplying electrical energy.

20. The combination of claim 17, wherein the data processing module includes a casing and a body mounting connected to the casing and worn on a part of the body of the user.

21. The combination of claim 20, wherein the body mounting includes a wrist strap.

22. The combination of claim 17; and further comprising an auxiliary module also supportable by the user during data collection; and a wireless transmitter for transmitting processed data between the processing and auxiliary modules.

23. The combination of claim 17; and further comprising and auxiliary module also supportable by the user during data collection; and a keypad and a display located on one of the data processing and auxiliary modules.

24. The combination of claim 17, wherein each module has an exterior periphery, and wherein each compartment has an interior periphery of complementary contour to the exterior periphery of each module.

25. The combination of claim 24, wherein the processing module includes a generally circular casing and a pair of side straps connected to, and extending in opposite directions from opposite lateral sides of, the casing; and wherein the second compartment has a generally circular recess for snugly receiving the casing, and a pair of side recesses for snugly receiving the side straps.

26. The combination of claim 17, wherein the storage unit includes a base in which the compartments are located, and a lid movable between an open position in which the compartments are accessible to the modules, and a closed position in which the lid covers the compartments.

27. The combination of claim 26, wherein each module contains a rechargeable battery, and wherein each compartment contains an electrical recharging contact through which an electrical current flows to recharge each battery when the modules are received in the compartments.

28. The combination of claim 27, wherein the storage unit includes a recharging socket and a switch actuated by movement of the lid to the closed position, the switch being operative to conduct the electrical current from the recharging socket to the contact in each compartment.

29. In a system for collecting data, a combination comprising:
   a) a collection module supportable by a user during data collection, and operative for collecting data;
   b) a data processing module also supportable by the user during data collection, and operative for processing the data collected by the collection module, the processing module containing a memory component for storing processed data; and
   c) a storage unit having a first compartment for receiving the collection module, and a second compartment for receiving the data processing module, when the modules are not supported by the user, the second compartment containing an electrical download contact through which the stored data is downloaded after reception of the processing module in the second compartment.

30. The combination of claim 29, wherein the storage unit includes a download socket through which the stored data is automatically downloaded.

31. The combination of claim 29, wherein the storage unit includes a download socket through which the stored data is downloaded upon request from an external host device.

32. In a process of reading bar code symbols, a method comprising the steps of:
   a) supporting, by a user, an optical scan module operative for scanning a bar code symbol to be read with a laser beam;
   b) supporting, by the user, a peripheral module operative for detecting laser light reflected off the symbol and for producing an electrical signal responsive to the detected laser light;
   c) inserting the scan module in a first compartment of a storage unit, after the scan module has been removed from the user;
   d) inserting the peripheral module in a second compartment of the storage unit, after the peripheral module has been removed from the user; and
   e) recharging the modules when the modules are received in the compartments.

33. The method of claim 32, wherein step (a) is performed by supporting the scan module on one finger of the user.

34. The method of claim 32, wherein step (b) is performed by strapping the peripheral module on a wrist of the user.

35. In a process of reading bar code symbols, a method comprising the steps of:
   a) supporting, by a user, an optical scan module operative for scanning a bar code symbol to be read with a laser beam;
   b) supporting, by the user, a peripheral module operative for detecting laser light reflected off the symbol and for producing an electrical signal responsive to the detected laser light;
   c) inserting the scan module in a first compartment of a storage unit, after the scan module has been removed from the user;
   d) inserting the peripheral module in a second compartment of the storage unit, after the peripheral module has been removed from the user;
   e) storing data corresponding to the electrical signal in the peripheral module; and
   f) downloading stored data when the peripheral module is received in the second compartment.

36. The method of claim 35, wherein the downloading step is performed automatically.

37. The method of claim 35, wherein the downloading step is performed upon request from an external host device.

* * * * *